(12) United States Patent
Gaddam et al.

(10) Patent No.: US 8,233,862 B2
(45) Date of Patent: Jul. 31, 2012

(54) RADIO SENSOR FOR DETECTING WIRELESS MICROPHONE SIGNALS AND A METHOD THEREOF

(75) Inventors: Vasanth R. Gaddam, Tarrytown, NY (US); Monisha Ghosh, Chappaqua, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 172 days.

(21) Appl. No.: 12/865,478

(22) PCT Filed: Feb. 16, 2009

(86) PCT No.: PCT/IB2009/050631
§ 371 (c)(1),
(2), (4) Date: Jul. 30, 2010

(87) PCT Pub. No.: WO2009/101606
PCT Pub. Date: Aug. 20, 2009

(65) Prior Publication Data
US 2010/0311341 A1   Dec. 9, 2010

Related U.S. Application Data

(60) Provisional application No. 61/149,361, filed on Feb. 3, 2009, provisional application No. 61/028,925, filed on Feb. 15, 2008.

(51) Int. Cl.
*H04B 1/18* (2006.01)
(52) U.S. Cl. ............... 455/150.1; 455/161.1; 455/197.1; 381/104
(58) Field of Classification Search ............... 455/150.1, 455/161.1, 197.1, 62, 68, 71, 84, 63.3; 381/104, 381/92, 321; 704/205
See application file for complete search history.

(56) References Cited

U.S. PATENT DOCUMENTS

| 5,119,427 A * | 6/1992 | Hersh et al. ................. 381/71.14 |
| 6,292,775 B1 * | 9/2001 | Holmes ......................... 704/209 |
| 7,126,467 B2 * | 10/2006 | Albert et al. ................... 340/521 |

(Continued)

FOREIGN PATENT DOCUMENTS
EP   1848114 A2   10/2007
(Continued)

OTHER PUBLICATIONS

Carlos Cordeiro et al: "Spectrum Sensing for Dynamic Spectrum Access of TV Bands", 2nd International Conference on Cognitive Radio Oriented Wireless Networks and Communications, 2007. CROWNCOM 2007,Aug. 1, 2007, pp. 225-233, IEEE, Piscataway, NJ, USA XP031276051.

(Continued)

*Primary Examiner* — Minh D Dao
(74) *Attorney, Agent, or Firm* — Larry Liberchuk

(57) ABSTRACT

Wireless microphone signals are detected by processing an input signal to determine a number of frequency bins within a channel frequency band having an energy level above a first predefined threshold (S510); identifying locations of the frequency bins having an energy level above the first predefined threshold, when the number of bins is greater than zero (S520, S530); for each frequency bin having an energy level above the first predefined threshold, processing signals within a narrow frequency band of the frequency bin (S570); determining a number of signal peaks within the narrow frequency band that are above a second predefined threshold (S575); and generating a message indicating a presence or an absence of a microphone signal based on the number of signal peaks (S590, S595).

15 Claims, 4 Drawing Sheets

U.S. PATENT DOCUMENTS

| | | | | |
|---|---|---|---|---|
| 7,129,833 | B2* | 10/2006 | Albert | 340/521 |
| 7,170,404 | B2* | 1/2007 | Albert et al. | 340/521 |
| 7,248,708 | B2* | 7/2007 | Vaudrey et al. | 381/94.7 |
| 7,567,678 | B2* | 7/2009 | Kong et al. | 381/92 |
| 7,760,893 | B1* | 7/2010 | Felber | 381/104 |
| 7,908,134 | B1* | 3/2011 | Felber | 704/205 |
| 2004/0220800 | A1* | 11/2004 | Kong et al. | 704/205 |
| 2010/0022205 | A1* | 1/2010 | Henry et al. | 455/95 |
| 2010/0030562 | A1* | 2/2010 | Yoshizawa et al. | 704/270 |
| 2010/0054085 | A1* | 3/2010 | Wolff et al. | 367/125 |
| 2010/0075704 | A1* | 3/2010 | McHenry et al. | 455/509 |
| 2010/0302459 | A1* | 12/2010 | Zhang et al. | 348/729 |
| 2010/0309317 | A1* | 12/2010 | Wu et al. | 348/180 |
| 2010/0309806 | A1* | 12/2010 | Wu et al. | 370/252 |
| 2011/0043710 | A1* | 2/2011 | Samarasooriya et al. | 348/735 |
| 2011/0081033 | A1* | 4/2011 | Kitazawa | 381/321 |
| 2011/0135126 | A1* | 6/2011 | Gozen | 381/313 |
| 2011/0280413 | A1* | 11/2011 | Wu et al. | 381/77 |

FOREIGN PATENT DOCUMENTS

| | | |
|---|---|---|
| RU | 2206101 C1 | 6/2003 |
| WO | WO2007135639 A1 | 11/2007 |

OTHER PUBLICATIONS

Cabric D et al: "Implementation Issues in Spectrum Sensing for Cognitive Radios", Signals, Systems and Computers, 2004. Conference Record of the Thirty-Eighth ASILOMAR Conference on Pacific Grove, CA,USA, vol. 1, Nov. 7, 2004, pp. 772-776, XP010781056 Piscataway, NJ, USA, IEEE.

Bellec M et al: "A PHY/MAC Proposal for IEEE 802.22 WRAN Systems—Part 1: The PHY-doc: IEEE 802.22-06/0004r0", Internet Citation, [Online] XP007902868 Retrieved from the Internet: URL: http://wwiiv. i eee802. org/22/Meeting_documents/2006_Jan/i ndex.html> [retrieved on Sep. 3, 2007] p. 26-p. 29.

Shridhar Mubaraq Mishra et al: "Cognitive Technology for Ultra-Wideband/WiMax Coexistence" 2nd IEEE International Symposium on New Frontiers in Dynamic Spectrum Access Networks, 2007. DYSPAN 2007,Apr. 1, 2007, pp. 179-186, XP031095617 IEEE, Piscataway, NJ, USA, ISBN: 978-1-4244-0663-0, Section IV, pp. 183.

Guanbo Zheng et al: "Enhanced Energy Detector for IEEE 802.22 WRAN Systems Using Maximal-to-Mean Power Ratio", 4th International Symposium on Wireless Communication Systems, 2007. ISWCS 2007, Oct. 1, 2007, pp. 370-374, XP031166793, IEEE, Piscataway, NJ, USA ISBN: 978-1-4244-0978-5.

Mishra S M et al: "Detect and Avoid: An Ultra-Wideband/WiMAX Coexistence Mechanism", Topics in Radio Communications, IEEE Communications Magazine, vol. 45, No. 6, Jun. 1, 2007, pp. 68-75, XP011185917, IEEE Service Center, Piscataway, USISSN: 0163-6804, p. 72.

Sunmin Lim et al., "The detection and classification of the Wireless Microphone signal in the IEEE 802.22 WRAN System", Proceedings of Asia-Pacific Microwave Conference 2007, Cognitive Radio Research Team Electronics. and Telecommunications Research Institute Daejeon, Republic of Korea.

* cited by examiner

RADIO SENSOR FOR DETECTING WIRELESS MICROPHONE SIGNALS AND A METHOD THEREOF

This patent application claims the priority benefit under 35 U.S.C. §119(e) of U.S. Provisional Patent Application 61/028,925, filed on Feb. 15, 2008, and Provisional Patent Application 61/149,361, filed on Feb. 3, 2009, the contents of which are herein incorporated by reference.

The present invention generally relates to systems for detecting radio signals, and more particularly for detecting wireless microphone signals.

In many wireless systems there is a need for identifying the presence of a signal in a given communication channel. As an example, a detection of radio signals broadcast by incumbent (or licensed) transmitters is required in a wireless system that employs unlicensed cognitive radios operating in terrestrial television (TV) channels. Typically, in such a wireless system if a received incumbent signal exceeds a certain power threshold, the TV channel is deemed to be occupied; otherwise, the TV channel is deemed to be unoccupied and hence available for unlicensed wireless use.

Wireless microphone signals also exist in the licensed TV spectrum. Thus, a cognitive radio sensor has to scan for such signals in addition to terrestrial television channels to determine channel occupancy. The communication range of wireless microphone signals, generated by wireless microphone devices, is limited to a few hundred of meters, and their transmit power is limited to 250 mW. The wireless microphone devices typically use analog frequency modulation (FM) schemes to generate a wireless signal with a bandwidth of 200 KHz. The wireless microphone signal could occupy any part of a 6 MHz TV channel band with the constraint that the centre frequency is a multiple of 25 KHz. The wireless microphone signal characteristics vary with the state of the microphone, e.g., indoor or outdoor silent, soft speaker, and hard speaker.

The identification of a signal presence is typically performed by radio sensors that are capable of detecting or sensing a low power signal. Radio sensors discussed in the related art correlate a received signal with a-priori known embedded patterns and characteristics, where the detection criteria are based upon correlated output levels that exceed a preset threshold. For example, a typical process executed by a conventional radio sensor includes sampling an input signal, correlating a known pattern with the fields of the sampled signal to provide peak samples, and comparing peak samples with a threshold to determine the presence of a signal in the communication channel. A known pattern may be, for example, an advanced television systems committee (ATSC) Field Sync data, a spectral signature, and the like.

Wireless microphone signals are not characterized with distinct patterns, thus the radio sensors typically depend on energy detection approaches to identify such signals. This is a major drawback of the radio sensors, as in a low signal to noise ratio (SNR) environment, the detection results are often unreliable and result in misdetections and/or false alarms.

It would be therefore advantageous to provide an efficient radio sensor for detecting wireless microphone signals.

Certain embodiments of the invention include a radio sensor for detecting wireless microphone signals. The radio sensor comprises a fast Fourier transform (FFT) module for transforming an input signal into a frequency domain signal; an accumulator for accumulating the output signals of the FFT module; and a decision unit for comparing an output signal of the accumulator to a predefined threshold and generating a message indicating a presence or an absence of a microphone signal based on the comparing result.

Certain embodiments of the invention include a radio sensor for detecting wireless microphone signals. The radio sensor comprises a fast Fourier transform (FFT) module for transforming an input signal into a frequency domain signal; a frequency domain filter for filtering an output signal of the FFT module; an accumulator for accumulating the output signals of the frequency domain filter; and a decision unit for comparing an output signal of the accumulator to a predefined threshold and generating a message indicating a presence or an absence of a microphone signal based on the comparing result.

Certain embodiments of the invention comprise a method for detecting wireless microphone signals. The method comprises processing an input signal to determine a number of frequency bins within a channel frequency band having an energy level above a first predefined threshold; identifying locations of the frequency bins having an energy level above the first predefined threshold, when the number of bins is greater than zero; for each frequency bin having an energy level above the first predefined threshold, processing signals within a narrow frequency band of the frequency bin; determining a number of signal peaks within the narrow frequency band that are above a second predefined threshold; and generating a message indicating a presence or an absence of a microphone signal based on the number of signal peaks.

Certain embodiments of the invention comprise a computer readable-medium having stored thereon computer executable code, when executed by a computer for detecting wireless microphone signals. The computer executable code causes a computer to execute the acts comprising processing an input signal to determine a number of frequency bins within a channel frequency band having an energy level above a first predefined threshold; identifying locations of the frequency bins having an energy level above the first predefined threshold, when the number of bins is greater than zero; for each frequency bin having an energy level above the first predefined threshold, processing signals within a narrow frequency band of the frequency bin; determining a number of signal peaks within the narrow frequency band that are above a second predefined threshold; and generating a message indicating a presence or an absence of a microphone signal based on the number of signal peaks.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
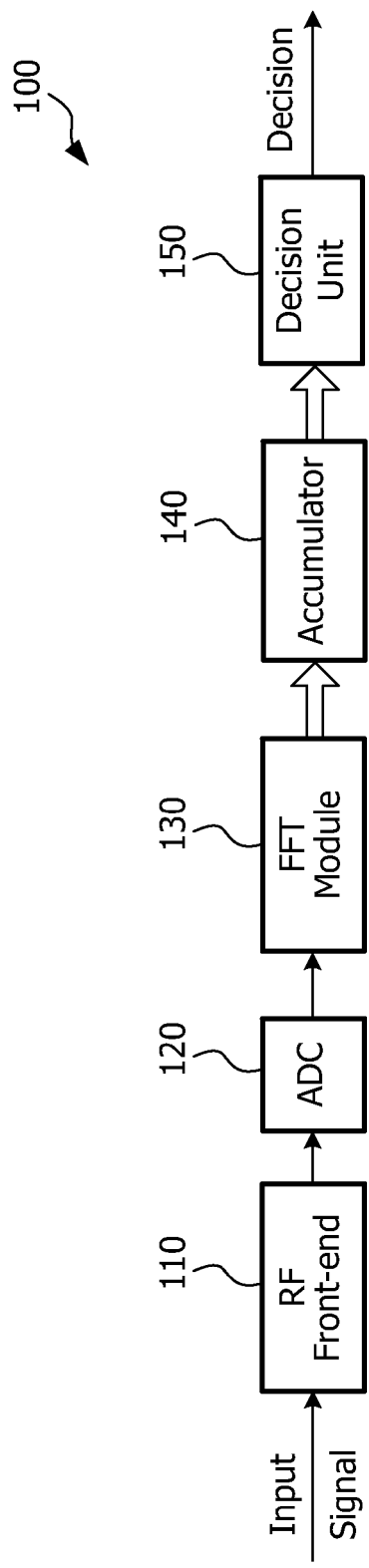
FIG. 1 is a block diagram of a radio sensor for detecting wireless microphone signals realized in accordance with one embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting and exemplary block diagram of a radio sensor 100 for detecting wireless microphone signals realized in accordance with one embodiment of the invention. The radio sensor 100 comprises a RF front-end 110, analog-to-digital (ADC) converter 120, a fast Fourier transform (FFT) module 130, an accumulator 140, and a decision unit 150. The radio sensor 100 is based on energy detection performed in the frequency domain. Specifically, the RF front-end 110 uses a band-pass filter (not shown) to pass only 6 MHz (i.e., a single TV channel) frequency band of the channel of interest. Then, the signal in the desired channel is down converted to either an intermediate frequency (IF) or DC (zero-IF). The down converted signal is then digitized by the ADC 120, and input to the FFT module 130.

Figure 2:
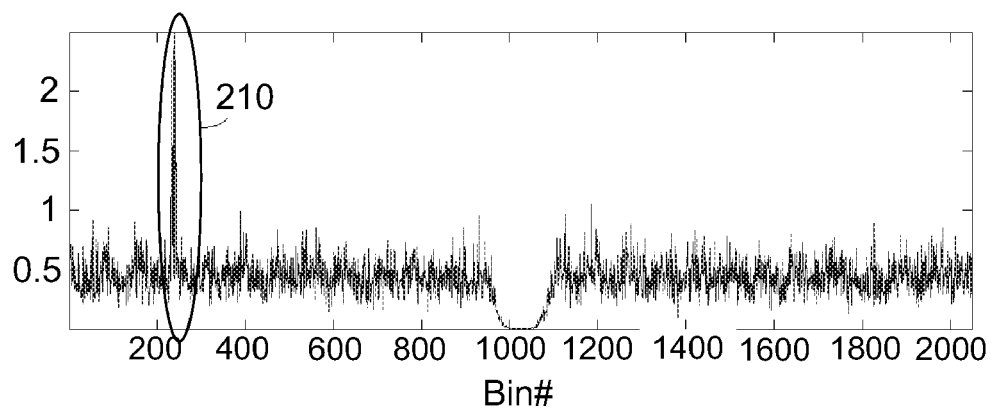
FIG. 2 is an exemplary graph showing a signal output by the radio sensor depicted in FIG. 1.

The FFT module 130 performs the tasks of pre-FFT processing and transforming a pre-processed signal into the frequency domain using a Fourier transform operation. The pre-FFT processing task include downshifting an input digital signal to a DC signal, applying a low pass filter with bandwidth of approximately 6 MHz, and down sampling the filtered signal. The size (i.e., a total number of data points to be transformed) of the FFT module 130 can vary depending on frequency resolution and computational requirement. In a preferred embodiment, a 2048-point FFT module with bin spacing significantly less than 200 KHz is utilized. The output of the FFT module 130 is then processed by the accumulator 140 which accumulates the output of the FFT module 130 using, for example, the following equation:

$$S_{k,n} = S_{k,n-1} + Y^2_{k,n} \; k=1, 2, \ldots N_{FFT}$$

where $S_{k,n}$ and $Y_{k,n}$ respectively represent the accumulator's 140 and FFT module's 130 outputs for a bin 'k' of an input block 'n'. $N_{FFT}$ represents a FFT size. An exemplary graph showing the output of the accumulator 140 in the presence of a wireless microphone signal is shown in FIG. 2. The output includes 2048 bins where the cluster of bins labeled 210 corresponds to that of a wireless microphone signal.

The output of the accumulator 140, $S_{k,n}$ is compared against a predefined threshold using the decision unit 150 to determine the presence or absence of a wireless microphone signal. If the value $S_{k,n}$ is above the predefined threshold for at least one bin (k), then a "signal present" message is generated; otherwise, a signal absent message is generated.

It should be noted that the actual bandwidth of the wireless microphone signal depends on the audio signal input to the microphone. Thus, the transmitted signal bandwidth ranges from a few kilo hertz to a maximum of 200 KHz. As a result, the output of accumulator 140 includes a variable number of bins having power levels higher than the rest of the bins. Therefore, in order to detect the different wireless microphone signals (regardless of the audio signals), all bin levels are compared against a predefined threshold. A signal present message is asserted if at least one bin level is higher than the threshold. The threshold is pre-determined from a statistical analysis using simulated and/or real signals to satisfy the desired probability of detection and probability of false alarm rates.

Figure 3:
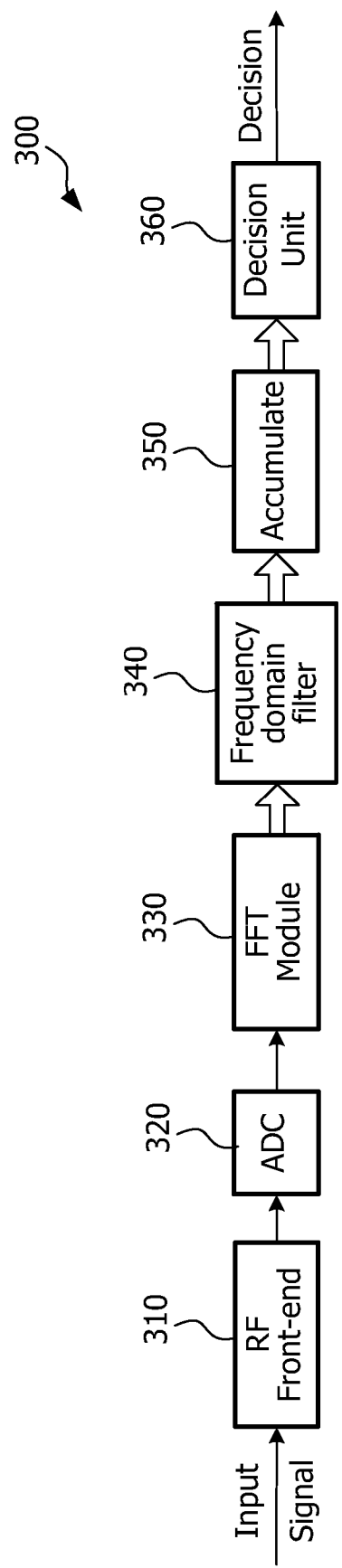
FIG. 3 is a block diagram of a radio sensor for detecting wireless microphone signals constructed in accordance with another embodiment of the invention.
Figure 4A:
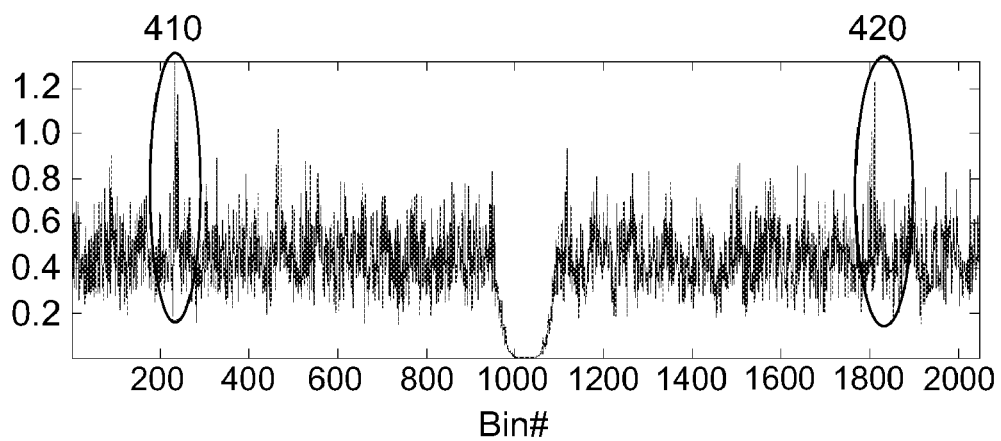
FIG. 4A shows a signal which was not filtered by the radio sensor depicted in FIG. 3.

FIG. 3 shows a non-limiting and exemplary block diagram of a radio sensor 300 for detecting wireless microphone signals realized in accordance with another embodiment of the invention. The radio sensor 300 comprises a RF front-end 310, analog-to-digital (ADC) converter 320, and FFT module 330, an accumulator 350, and a decision unit 360. These components have similar functionality to the equivalent components described above. The radio sensor 300 is based on energy detection performed in the frequency domain using frequency domain filtering. This feature enables detecting with high probability and with a lower false alarm rate wireless microphone signals in noisy environment. FIG. 4A shows an input signal (after conversion to a frequency domain) when the SNR is −25 db. As can be noticed, there are two clusters of bins labeled 410 and 420 where the bin levels are higher than the rest of the bin levels. The cluster 410 corresponds to a microphone signal, while the other cluster 420 is due to a noise component. A false detection can occur if the noise component exceeds the threshold.

Figure 4B:
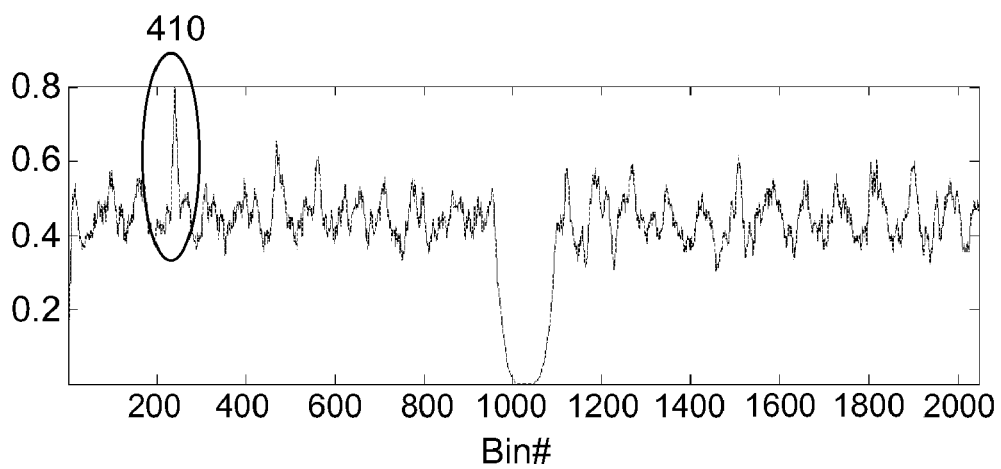
FIG. 4B shows a signal which has been filtered by the radio sensor depicted in FIG. 3.

In accordance with certain principles of the invention, in order to reduce the false alarm rate, a frequency domain filter 340 is utilized to reduce the impact of spurious noise by filtering the output of the FFT module 330. Specifically, for each frequency bin, the frequency domain filter 340 calculates a weighted sum of the current bin, 'M' bins immediately preceding the current bin, and 'M' bins immediately following the current bin (provided that they exist). The weights are determined by the filter coefficients $H_{m,n}$. The operation of the frequency domain filter 340 may be described using, for example, the following equation:

$$X_{k,n} = \sum_{m=-M}^{M} Y^2_{k+m,n} H_{m,n}$$

where $X_{k,n}$ is the output of the filter 340 for a bin 'k' (k≤NFFT) and an input block 'n'. The parameter $H_{m,n}$ represents the filter coefficients. The value $Y_{k,n}$ is the output of the FFT module 330. The frequency domain filter 340 is static (i.e., its coefficients are independent of the time) and its length is 2M+1, namely 2M+1 samples are used to calculate each output data point $X_{k,n}$. In another embodiment, the frequency domain filter 340 can be connected to the output of the accumulator 350. FIG. 4B shows the output of the accumulator 350 after the processing of the frequency domain filter 340. The input signal is the same signal used to simulate the signal shown in FIG. 4A. As can be noticed, now the noise component is eliminated and as a result the probability of false alarms is reduced without significantly impacting the probability of detection. It should be noted that noise components may be present even when a microphone signal is absent. In such cases, the radio sensor 300 does not identify a noise component as a wireless microphone signal.

Figure 5:
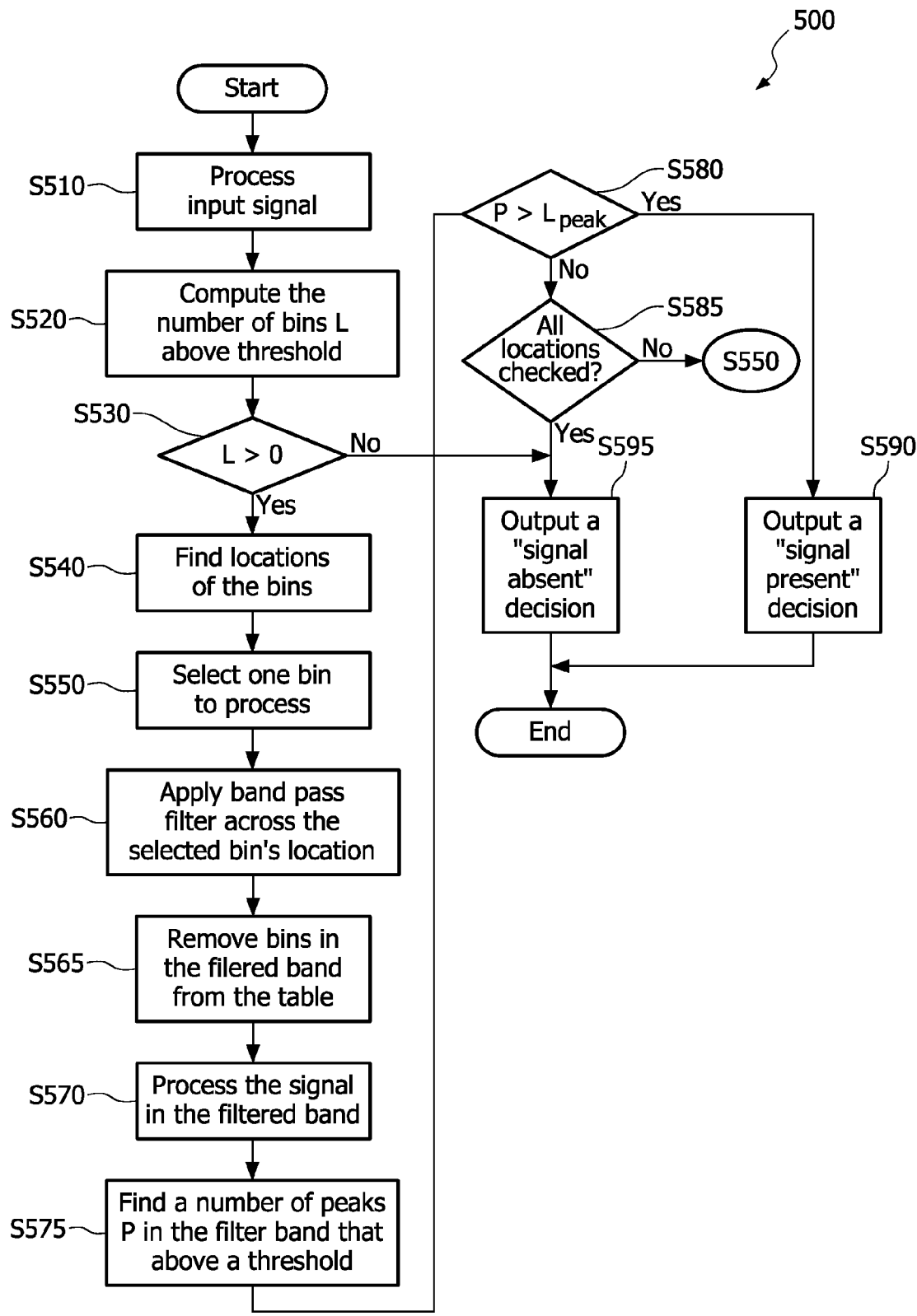
FIG. 5 is a flowchart describing the method of two-stage signal detection implemented in accordance with an embodiment of the invention.

FIG. 5 shows a non-limiting and exemplary flowchart 500 describing the method for detecting microphone signals implemented in accordance with an embodiment of the invention. The method reduces the false alarm rate by performing two-stage detection.

At S510, an input signal is processed to detect microphone signals. The signal processing may be performed using either the radio sensor 100 or 300 described in detail above. At S520, the output of step S510 is analyzed to determine the number of bins that are above the predefined threshold. The number of bins that exceed the threshold may be calculated as follows:

$$L = \sum_{k=1}^{N_{FFT}} f(S_{k,N}, \text{threshold})$$

where, $$f(S_{k,N}, \text{threshold}) = \begin{matrix} 1 & S_{k,N} > \text{threshold} \\ 0 & \text{otherwise} \end{matrix}$$

At S530, a check is made to determine if the count 'L' is greater than 0, and if so the process continues with S540; otherwise, execution proceeds to S595 where a "signal absent" message is asserted and then execution terminates. At S540, the locations of those bins exceeding the predefined threshold are determined. The locations with the respective bin numbers are saved in a table, where the first entry includes the bin closer to the lower band edge. At S550, a bin location from the table (starting from the first bin) is selected. At S560, the input signal is filtered using a 200 KHz band pass filter, where the filter's center frequency is set according to the frequency of the selected bin. At S565, the table is updated to remove all bins that were included within the 200 KHz band of the selected bin. At S570, the output of the band pass filter is down converted to DC, down sampled and then transformed to a frequency domain signal using a FFT operation, and accumulated as described in detail above. In a preferred embodiment the size of the FFT is 256. At S575, the accumulation result 'S' is compared to a predefined threshold to determine the number of peaks 'P' that exceed the threshold. At S580, it is determined if the number of peaks 'P' is greater than the value of $L_{peak}$, where $L_{peak}$ is a predefined value. If so, at S590 a "signal present" message is generated and execution ends; otherwise, execution continues with S585 where another check is made to determine if all bins' locations found at S540 were processed, i.e., if the table is empty. If so, execution continues with S595; otherwise, execution returns to S550 where another bin to be processed is selected from the table.

Figure 6A:
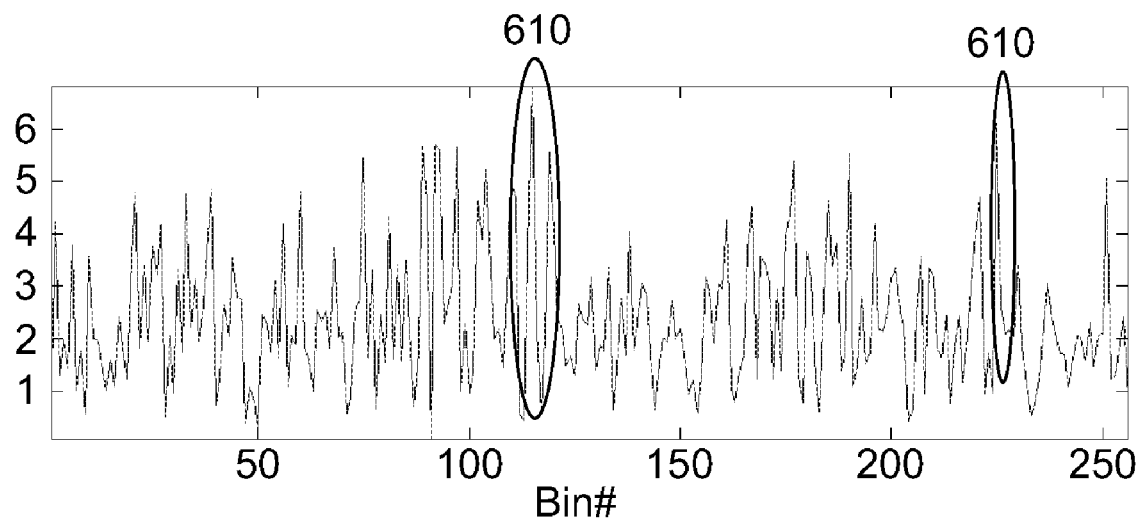
FIGS. 6A and 6B are graphs illustrating the operation of the method described in FIG. 5.
Figure 6B:
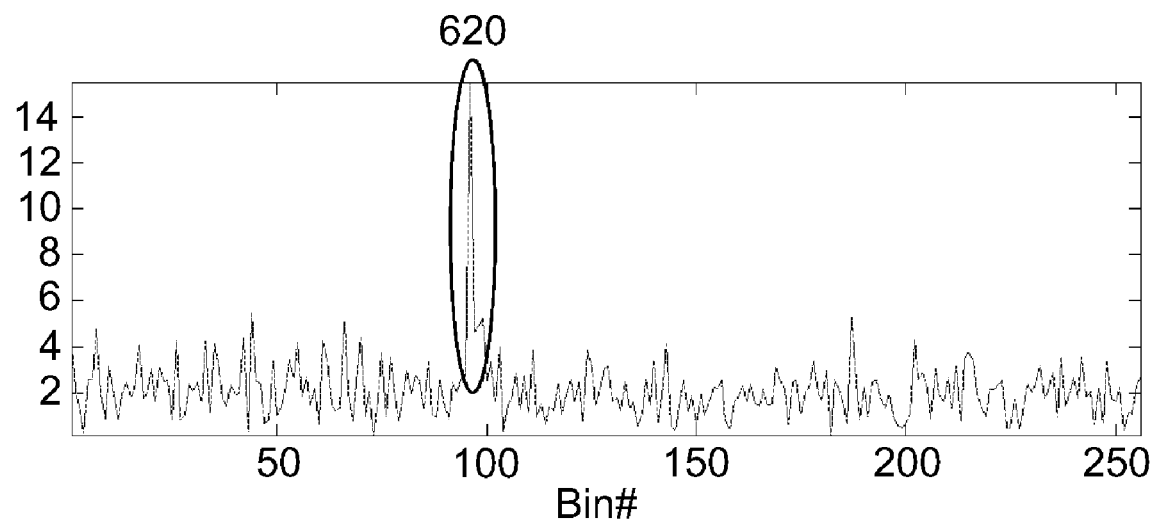

As an example, FIGS. 6A and 6B show the output of the detection method 500 with an input wireless microphone signal 610 and a tone signal 620 respectively. As can be observed, the two signals show different patterns. For an $L_{peak}$ value of 2, the wireless microphone signal 610 can be detected, but not the tone signal 620 as the latter signal includes only one peak. It would be appreciated that by not detecting tone signals the false alarm rate can be reduced significantly.

The foregoing detailed description has set forth a few of the many forms that the present invention can take. It is intended that the foregoing detailed description be understood as an illustration of selected forms that the invention can take and not as a limitation to the definition of the invention. It is only the claims, including all equivalents that are intended to define the scope of this invention.

Preferably, the principles of the invention can be adapted to detect any type of narrowband signals. Most preferably, the principles of the invention are implemented in hardware, firmware, software, or combination thereof Moreover, the hardware maybe a digital circuit, an analog circuit, or combination thereof Furthermore, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A radio sensor (100) for detecting wireless microphone signals, comprising:
   a fast Fourier transform (FFT) module (130) for transforming an input signal into a frequency domain signal;
   an accumulator (140) for accumulating the output signals of the FFT module (130); and
   a decision unit (150) for comparing an output signal of the accumulator (140) to a predefined threshold and generating a message indicating a presence or an absence of a microphone signal based on the comparing result.

2. The radio sensor of claim 1, further comprising:
   a radio frequency (RF) front end (110) for selecting a channel frequency band of only one channel; and
   an analog-to-digital converter (ADC) (120) for digitizing the input signal.

3. The radio sensor of claim 2, wherein the FFT module is further capable of pre-FFT processing the input signal, the pre-FFT processing comprising:
   downshifting the input signal to a direct current (DC) signal;
   applying a low pass filter with a bandwidth of the frequency band; and
   down sampling the filtered signal.

4. The radio sensor of claim 1, wherein a signal present message is generated if at least one frequency bin within the output signal of the accumulator is above the predefined threshold.

5. A radio sensor (300) for detecting microphone wireless signals, comprising:
   a fast Fourier transform (FFT) module (330) for transforming an input signal into a frequency domain signal;
   a frequency domain filter (340) for filtering an output signal of the FFT module (330);
   an accumulator (350) for accumulating the output signals of the frequency domain filter (340); and
   a decision unit (360) for comparing an output signal of the accumulator (340) to a predefined threshold and generating a message indicating a presence or an absence of a microphone signal based on the comparing result.

6. The radio sensor of claim 5, further comprising:
   a radio frequency (RF) front end (310) for selecting a channel frequency band of only one channel; and
   an analog-to-digital converter (ADC) (320) for digitizing the input signal.

7. The radio sensor of claim 6, wherein the FFT module is further capable of pre-FFT processing the input signal, the pre-FFT processing comprising:
   downshifting the input signal to a direct current (DC) signal;
   applying a low pass filter with a bandwidth of the channel frequency band; and
   down sampling the filtered signal.

8. The radio sensor of claim 5, wherein filtering the output signal of the FFT module comprises, for each frequency bin within the output signal, calculating a weighted sum of a current frequency bin, M bins immediately preceding the current frequency bin, and M bins immediately following the current frequency bin, wherein M is determined based on a size of the FFT module and a bandwidth of a signal being detected.

9. The radio sensor of claim 5, wherein a signal present message is generated if at least one frequency bin within the output signal of the accumulator is above the predefined threshold.

10. A method (500) for detecting wireless microphone signals, comprising:
   processing an input signal to determine a number of frequency bins within a channel frequency band having an energy level above a first predefined threshold (S510);
   identifying locations of the frequency bins having an energy level above the first predefined threshold, when the number of bins is greater than zero (S520, S530);
   for each frequency bin having an energy level above the first predefined threshold, processing signals within a narrow frequency band of the frequency bin (S570);
   determining a number of signal peaks within the narrow frequency band that are above a second predefined threshold (S575); and
   generating a message indicating a presence or an absence of a microphone signal based on the number of signal peaks (S590, S595).

11. The method of claim 10, wherein processing the input signal further comprising:
   transforming the input signal into a frequency domain signal using a FFT operation;
   accumulating the output signals of the FFT operation; and
   comparing the accumulating results to the first predefined threshold.

12. The method of claim 10, wherein processing the signals within the narrow frequency band of the frequency bin further comprising:
   setting a band pass filter across a center frequency of the frequency bin, wherein the frequency band of the band pass filter is as the microphone-signal frequency band (S560);
   converting an output signal of the band pass filter to a direct current (DC) signal;
   down sampling the signal
   transforming the down-sampled signal to a frequency domain signal using a FFT operation; and
   accumulating the output signals of the FFT operation.

13. The method of claim of claim 10, wherein a signal present message is generated when the number of signal peaks is above a predefined number of maximum peaks.

14. The method of claim 10, wherein the channel frequency band is 6 MHz and wherein the narrow frequency band is 200 kHz.

15. A computer readable medium having stored thereof computer executable code for detecting wireless microphone signals, comprising:
   processing an input signal to determine a number of frequency bins within a channel frequency band having an energy level above a first predefined threshold (S510);
   identifying locations of the frequency bins having an energy level above the first predefined threshold, when the number of bins is greater than zero (S520, S530);
   for each frequency bin having an energy level above the first predefined threshold, processing signals within a microphone-signal frequency band of the frequency bin (S570);
   determining a number of signal peaks within the microphone-signal frequency band that are above a second predefined threshold (S575); and
   generating a message indicating a presence or an absence of a microphone signal based on the number of signal peaks (S590, S595).

* * * * *